United States Patent
Nemitallah et al.

(10) Patent No.: US 10,844,815 B2
(45) Date of Patent: *Nov. 24, 2020

(54) POWER TURBINE SYSTEM WITH FUEL INJECTOR AND CONDENSOR

(71) Applicant: KING FAHD UNIVERSITY OF PETROLEUM AND MINERALS, Dhahran (SA)

(72) Inventors: Medhat A. Nemitallah, Dhahran (SA); Mohamed A. Habib, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 176 days.

This patent is subject to a terminal disclaimer.

(21) Appl. No.: 16/209,209

(22) Filed: Dec. 4, 2018

(65) Prior Publication Data
US 2019/0107084 A1    Apr. 11, 2019

Related U.S. Application Data

(63) Continuation of application No. 15/084,448, filed on Mar. 29, 2016, now Pat. No. 10,202,946.

(51) Int. Cl.
*F02M 27/00* (2006.01)
*F02C 3/24* (2006.01)
(Continued)

(52) U.S. Cl.
CPC ........... *F02M 27/00* (2013.01); *B01D 53/22* (2013.01); *B01D 53/265* (2013.01); *C01B 13/0251* (2013.01); *F02C 3/24* (2013.01)

(58) Field of Classification Search
CPC ..... F02C 3/04; F02M 27/00; B01D 2053/222; B01D 2053/223; B01D 69/04;
(Continued)

(56) References Cited

U.S. PATENT DOCUMENTS 2,608,055 A    8/1952 Welsh
5,820,654 A *  10/1998 Gottzman ............ B01D 53/229
                                                95/54
(Continued)

*Primary Examiner* — Carlos A Rivera
(74) *Attorney, Agent, or Firm* — Oblon, McClelland, Maier & Neustadt, L.L.P.

(57) ABSTRACT

The power turbine system includes two power turbines communicating with an ion transport membrane (ITM) reactor. Heavy liquid fuel is atomized and burned within the reactor to drive the first turbine, with the first turbine producing useful power. Exhaust from the first turbine is recycled back into the reactor. The reactor includes a series of concentric cylindrical ion transport membranes that separate atmospheric and exhaust gases into suitable components for combustion therein, with at least some of the gases being "cracked" to alter their molecular structure for further combustion to power the second turbine. The second turbine drives a compressor to supply air to the reactor. At least one of the ITMs precludes atmospheric nitrogen from the combustion processes, with the resulting exhaust including pure water and carbon dioxide. The carbon dioxide is either recycled into the reactor to facilitate fuel atomization, or compressed for sequestration.

7 Claims, 1 Drawing Sheet

(51) Int. Cl.
*B01D 53/22* (2006.01)
*C01B 13/02* (2006.01)
*B01D 53/26* (2006.01)

(58) Field of Classification Search
CPC ........ B01D 69/06; B01D 53/22; Y02C 10/12; Y02E 20/18; Y02E 20/185
See application file for complete search history.

(56) References Cited

U.S. PATENT DOCUMENTS

| | | | | |
|---|---|---|---|---|
| 5,820,655 A * | 10/1998 | Gottzmann | ............ | B01D 53/22 95/54 |
| 6,139,810 A * | 10/2000 | Gottzmann | ............. | B01J 8/009 422/608 |
| 6,296,686 B1 * | 10/2001 | Prasad | .................... | B01J 8/009 95/51 |
| 6,394,043 B1 * | 5/2002 | Bool, III | ................ | B01B 1/005 122/31.1 |
| 6,402,988 B1 * | 6/2002 | Gottzmann | ............. | B01J 8/009 252/373 |
| 6,537,465 B2 * | 3/2003 | Gottzmann | .......... | B01D 53/228 252/373 |
| 6,537,514 B1 | 3/2003 | Prasad et al. | | |
| 7,160,357 B2 * | 1/2007 | Gottzmann | .......... | B01D 53/228 60/783 |
| 8,728,202 B2 | 5/2014 | Repasky et al. | | |
| 9,004,909 B2 | 4/2015 | Ghoniem et al. | | |
| 9,010,152 B2 | 4/2015 | Huang et al. | | |
| 9,021,814 B2 | 5/2015 | Greeff | | |
| 9,664,115 B2 * | 5/2017 | Nemitallah | ......... | C01B 13/0207 |
| 2005/0126156 A1 | 6/2005 | Anderson et al. | | |
| 2007/0044479 A1 * | 3/2007 | Brandt | ...................... | C01B 3/36 60/783 |
| 2013/0022537 A1 * | 1/2013 | Brandt | ...................... | C01B 3/36 423/650 |
| 2013/0213049 A1 | 8/2013 | Allam et al. | | |
| 2014/0183866 A1 * | 7/2014 | Kromer | ................ | F01K 23/067 290/52 |
| 2015/0176487 A1 * | 6/2015 | Habib | .................... | B01D 63/06 60/39.461 |
| 2015/0267611 A1 | 9/2015 | Nemitallah et al. | | |

* cited by examiner

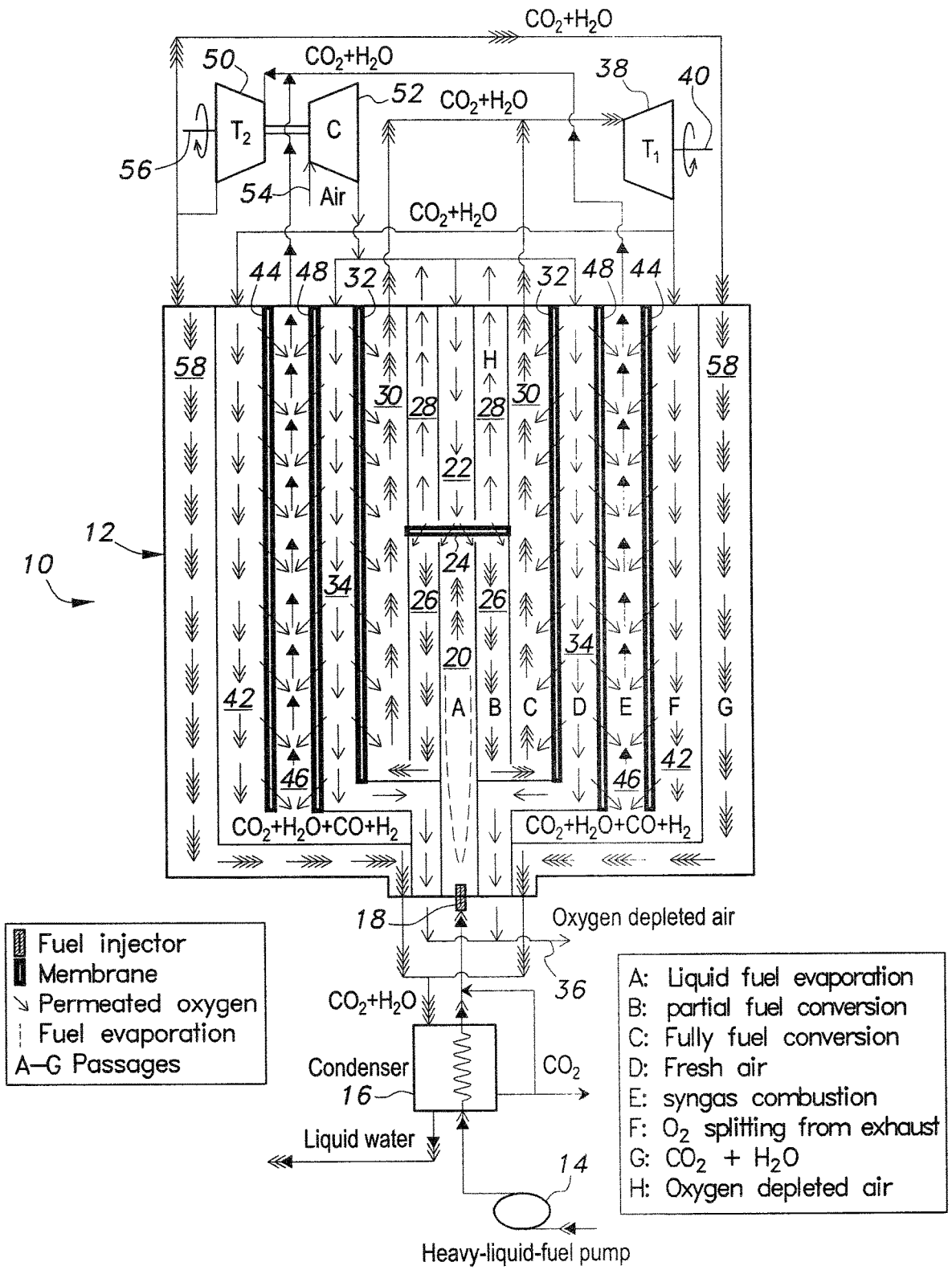

POWER TURBINE SYSTEM WITH FUEL INJECTOR AND CONDENSOR

CROSS-REFERENCE TO RELATED APPLICATIONS

The present application is a Continuation of Ser. No. 15/084,448, now allowed, having a filing date of Mar. 29, 2016.

BACKGROUND OF THE INVENTION

1. Field of the Invention

The present invention relates generally to power generating systems, and particularly to a power turbine system utilizing oxy-combustion for carbon capture.

2. Description of the Related Art

Increasing population pressures and the demand for increased comfort have resulted in increasing demands for power production. These demands have generally been met conventionally by power plants burning fossil fuels, i.e., coal and various weights or viscosities of fuel oils. The problem with the use of such fuels in conventional power plants is that their exhaust emissions contain massive amounts of carbon dioxide ($CO_2$), which is known as a "greenhouse gas" that contributes substantially to global warming. Also, as gaseous nitrogen ($N_2$) forms about 80% of the earth's atmosphere, a certain amount of the atmospheric oxygen ($O_2$) used in the combustion of fossil fuels instead combines with some of the atmospheric nitrogen due to the heat developed during the combustion process, producing various oxides of nitrogen (NOx) that are harmful to the atmosphere.

While certain other energy sources have been developed for the production of power, e.g., hydroelectric, solar, etc., these "clean" energy sources have not been able to keep up with the increasing demands for power in most areas of the world. Accordingly, it is necessary to continue to burn fossil fuels to respond to power demands throughout most of the world, with the resulting $CO_2$ and NOx emissions being accepted as a necessary evil of such power production. While many advances have been made in the reduction of $CO_2$ and NOx emissions from power plants and other sources, emissions from fossil fuel burning power plants are by no means perfectly clean in this regard.

Thus, a power turbine system solving the aforementioned problems is desired.

SUMMARY OF THE INVENTION

The power turbine system essentially comprises two power turbines in communication with an ion transport membrane (ITM) reactor that combusts fuel to provide energy to the turbines. The ITM reactor includes a series of concentric cylindrical ion transport membranes that define corresponding working chambers, and a centrally disposed "button cell" or disc-shaped ion transport membrane. Heavy liquid fuel is injected or pumped into the reactor, and is burned in a two-stage process to promote more complete combustion with fewer undesirable exhaust byproducts. Atmospheric air is pumped into the reactor from the second turbine, which is dedicated to driving a compressor to supply air to the reactor. Some of the ITMs within the reactor serve to separate atmospheric oxygen ($O_2$) from the air, with the oxygen passing through the membranes for combustion with the fuel. Atmospheric nitrogen ($N_2$) is restricted from the combustion process, and is ultimately exhausted from the reactor. The exhaust resulting from combustion is essentially pure water ($H_2O$) and carbon dioxide ($CO_2$), with some of the $CO_2$ being recycled into the reactor at the fuel injector to assist in "cracking" the heavy liquid fuel into extremely fine droplets to optimize combustion. The remaining balance of the $CO_2$ is collected for sequestration.

The ITM reactor also produces a synthetic gas ("syngas") of gaseous hydrogen ($H_2$) and carbon monoxide (CO) that is combusted with gaseous oxygen ($O_2$), with the resulting combustion product ($CO_2$ and $H_2O$) driving the second turbine. The result of the various combustive processes and reactions within the ITM reactor is the production of useful power from the output of the first turbine, with the exhaust products comprising essentially pure water, carbon dioxide that is sequestered to prevent release to the atmosphere, and free gaseous nitrogen that is released back to the atmosphere.

These and other features of the present invention will become readily apparent upon further review of the following specification and drawings.

BRIEF DESCRIPTION OF THE DRAWINGS

The sole drawing FIGURE is a schematic side view in section of a power turbine system according to the present invention, illustrating its general features.

Similar reference characters denote corresponding features consistently throughout the attached drawing.

DETAILED DESCRIPTION OF THE PREFERRED EMBODIMENTS

The power turbine system incorporates two separate power turbines that receive their input energy from an ion transport membrane (ITM) reactor, rather than from a conventional combustion source. For example, the turbines of the ITM reactor can be powered by oxy-combustion of a heavy liquid fuel in the ITM reactor.

The ITM reactor utilizes a series of ion transport membranes (ITMs) within the reactor that separate oxygen from other atmospheric and exhaust gases in the reactor, resulting in a final exhaust product comprising essentially pure carbon dioxide ($CO_2$) that is recycled or sequestered, and water. Thus, oxygen is separated inside the combustion system using the ion transport membranes (ITMs). Suitable membrane materials which can be used include, for example, lanthanum cobaltite perovskite ceramics, modified proviskite ceramics, brownmillerite structured ceramics, ceramic metal dual phase membranes, in addition to, thin duel phase membranes which includes chemically stable yttria-stabilized zirconia (YSZ).

For oxy-combustion to occur, the hydrocarbon fuel, e.g., heavy liquid fuel, can be burned in a medium of pure oxygen and some recycled exhaust gases instead of air (nitrogen is not introduced into the combustion chamber). Oxygen is separated inside the ITM reactor using the ion transport membranes (ITM), typically at temperatures ranging from 650° C. to 950° C. The ion transport membranes (ITMs) are activated for oxygen separation from the feed side to the permeate side of the membrane. In the permeate side of the membrane, fuel is being burned with the separated oxygen in a medium of recycled carbon dioxide. In this process, the combustion products consist of a mixture of only carbon dioxide and water vapor. Water vapor can be easily condensed and accordingly carbon dioxide can be captured for industrial use or storage.

The drawing FIGURE provides a schematic elevation view in section of the power turbine system 10. The multistage ITM reactor 12 can have a cylindrical configuration, with a series of concentric cylindrical ion transport membranes (ITMs) defining a corresponding series of concentric cylindrical working chambers therebetween. A description of the various components of the power turbine system 10, depicted in the FIGURE, is provided below.

A fuel pump 14 can pump a heavy liquid fuel, e.g., fuel oil, etc., through a water and carbon dioxide heat exchanger or condenser 16 disposed externally to the reactor 12. The condenser 16 serves to cool exhaust output (particularly the water vapor fraction) from the reactor 12 while simultaneously warming the incoming heavy liquid fuel. The heavy liquid fuel is indicated schematically in the drawing FIGURE by a single arrow barb followed by a solid arrow head. The fuel can be injected into the ITM reactor 12 by an injector 18 disposed at the bottom of the reactor. The fuel is injected into an elongate fuel evaporation core 20 (also designated by the letter A) disposed centrally within the reactor 12. A cylindrical fuel partial conversion chamber 26 is disposed concentrically about the fuel evaporation core 20. The injected fuel is heated in the fuel evaporation core 20 by heat flowing from the cylindrical fuel partial conversion chamber 26, as described in more detail below, which results in fuel evaporation. Atmospheric air, designated schematically in the drawing as arrows with single barbed arrowheads, is pumped into a first or central air delivery passage 22 disposed concentrically above the fuel evaporation core 20. A centrally disposed "button cell," i.e., disc-shaped, ion transport membrane 24 is located between the first air delivery passage 22 and the fuel evaporation core 20. The button cell ion transport membrane 24 permits only oxygen ($O_2$) to permeate therethrough. The remaining oxygen depleted air (nitrogen and other trace gas) leaves the reactor through a gaseous nitrogen output chamber 28. Partial combustion or conversion of the vaporized fuel, indicated by arrows having three barbed heads, can occur close to the surface of the button cell ITM 24 in the fuel partial conversion chamber 26 (also designated by the letter B in the drawing FIGURE) due to the oxygen passing through the button cell ITM 24. The resulting heat is used in heating and evaporating the liquid fuel introduced into the fuel evaporation core 20 to activate it for oxygen permeation.

The button cell ITM 24 extends diametrically above the fuel partial conversion chamber 26 to provide oxygen to the fuel within the fuel partial conversion chamber 26, and thereby, provide partially converted or burned fuel. The partial fuel conversion chamber 26 also serves as a heavy liquid fuel heater, as some of the heat developed by the combustion process within the fuel partial conversion chamber 26 is transferred to the central fuel evaporation core 20 to assist in the fuel evaporation process. Oxygen-depleted air comprising nearly pure nitrogen ($N_2$, represented by arrows with single barb heads) is blocked by the button cell ITM 24, and flows upward through the gaseous nitrogen output chamber 28 (also designated by the letter H) disposed concentrically about the first air delivery passage 22 and above the fuel partial conversion chamber 26, and thence out of the reactor 12 to the atmosphere.

The partially converted or burned fuel flows from a lower portion of the fuel partial conversion chamber 26 into a cylindrical fuel complete conversion chamber 30 (also designated by the letter C) disposed concentrically about the fuel partial conversion chamber 26 and the gaseous nitrogen output chamber 28. The outer wall of this chamber 30 is defined by a cylindrical first oxygen separation membrane 32 (an ITM) disposed concentrically about the fuel complete conversion chamber 30. Atmospheric air (represented by arrows with single barb heads) is pumped into a cylindrical second air delivery passage 34 disposed about the first oxygen separation membrane 32, with oxygen passing through the first oxygen separation membrane 32 and into the fuel complete conversion chamber 30, where the fuel is completely converted or combusted to form a first exhaust product. Heat resulting from the combustion process in the fuel complete conversion chamber 30 serves to heat the first oxygen separation membrane (ITM) 32 for greater efficiency, with some of this heat being transferred to the incoming atmospheric air flowing through the second air delivery passage 34. Excess oxygen depleted air 36 (nearly all gaseous nitrogen, $N_2$) flows from the second air delivery passage 34, out the bottom of the reactor 12.

The first exhaust product is formed in the fuel complete conversion chamber 30 by the combustion of the heavy fuel, comprising various hydrocarbon forms, with essentially pure oxygen, as described above. The resulting first exhaust product includes essentially pure carbon dioxide ($CO_2$) and water ($H_2O$), as there is no nitrogen involved in the combustion process to form various oxides of nitrogen (NOx). The carbon dioxide and water first exhaust product departs the top of the fuel complete conversion chamber 30 and flows to a first power turbine 38 to drive the turbine, which produces useful work by means of its output shaft 40.

Rather than expelling the carbon dioxide and water first exhaust product to the atmosphere, this first exhaust product is recycled back to the reactor 12 where it flows into a first turbine exhaust collection and synthetic gas production chamber 42 (also designated by the letter F) disposed concentrically about an outermost or third oxygen separation membrane 44. This flow is indicated by arrows with two barbed heads in the drawing FIGURE. As this first exhaust product reaches the lower end of the chamber 42, it flows radially inward to flow into and upward into a concentric cylindrical synthetic gas (syngas) combustion chamber 46 disposed between concentric cylindrical second and third oxygen separation membranes, respectively 48 and 44, disposed respectively about the second air delivery passage 34 and the synthetic gas combustion chamber 46.

It should be noted that the gases at the lower or outflow end of the first turbine exhaust and syngas production chamber 42 include carbon monoxide (CO) and gaseous hydrogen ($H_2$), i.e., "syngas." This is because some of the oxygen bound in the carbon dioxide ($CO_2$) and water ($H_2O$) molecules is stripped from its molecules during the passage of the first turbine exhaust through the chamber 42. However, the second and third ITM oxygen separation membranes 48 and 44 defining the syngas combustion chamber 46 concentrically therebetween, provide oxygen to complete the oxidation process (combustion) of the carbon monoxide and gaseous hydrogen within the syngas combustion chamber 46, resulting in essentially pure carbon dioxide ($CO_2$) and water ($H_2O$) for a second exhaust product, indicated by the solid head arrows within the syngas combustion chamber 46.

The second exhaust product flows from the synthetic gas combustion chamber 46 to power a second power turbine 50. This second power turbine 50 functions primarily to drive an air compressor 52, which draws in atmospheric air 54 and compresses that air to deliver it to the two air delivery passages 22 and 34. The second power turbine 50 may also provide useful mechanical power by means of an output shaft 56.

Exhaust gases from the second power turbine comprise essentially pure carbon dioxide ($CO_2$) and water ($H_2O$), with these gases being returned to the outermost second turbine exhaust collection chamber 58 (also indicated by the letter G), disposed concentrically about the first turbine exhaust collection and synthetic gas production chamber 42. These second power turbine exhaust gases are represented by arrows having four barbed heads. The placement of the second turbine exhaust collection chamber 58 about the other chambers of the reactor 12 serves to heat the other chambers, which is desirable in order to optimize the efficiency of the various ion transport membranes 24, 32, 44, and 48 within the reactor 12.

The second turbine exhaust gases are collected and routed to the heat exchanger and condenser 16, where they warm the incoming heavy liquid fuel to assist in its evaporation. The incoming heavy liquid fuel also cools the exhaust gases, particularly the water vapor therein, with liquid water flowing from the heat exchanger and condenser 16 for collection. The carbon dioxide portion of the exhaust is also collected for sequestration, with a portion of that carbon dioxide exhaust being recirculated to the heavy liquid fuel prior to its injection into the fuel evaporation core 20. The recirculated $CO_2$ assists in atomizing the heavy liquid fuel and carrying the atomized and/or evaporated fuel through the fuel evaporation core 20 and further through the fuel partial conversion chamber 26 and fuel complete combustion chamber 30.

It will be noted that gas flow through the various chambers of the reactor 12 is configured such that the flow in each chamber, as indicated by the direction of the various gas flow arrows, is in the opposite direction to that of the adjacent chambers, with the exception of the outermost second turbine exhaust collection chamber 58. This countercurrent flow between adjacent chambers serves to increase the oxygen permeation rate of the various ITMs of the system. This flow configuration results in the low oxygen partial pressure region on one side of a given ITM corresponding with the partial pressure region, and vice versa. The net result of this opposite flow direction or countercurrent is a more uniform and stable flame distribution and correspondingly more uniform membrane surface temperature, thus enhancing ITM life within the reactor 12.

It is to be understood that the present invention is not limited to the embodiments described above, but encompasses any and all embodiments within the scope of the following claims.

We claim:

1. A power turbine system with integrated fuel line and condenser, comprising:
    a multi-stage ion transport membrane reactor, the multi-stage ion transport membrane reactor having an elongate fuel, evaporation core, a first air delivery passage disposed above the fuel evaporation core, a button cell ion transport membrane disposed between the fuel evaporation core and the first air delivery passage, and a plurality of ion transport membranes spaced from the elongate fuel evaporation core and the first air delivery passage, the membranes defining corresponding working chambers therebetween;
    a first power turbine communicating with the reactor;
    a second power turbine communicating with the reactor;
    an air compressor communicating with the second power turbine and the reactor;
    a cylindrical fuel partial conversion chamber disposed concentrically about the fuel evaporation core;
    a gaseous nitrogen output chamber disposed concentrically about the first air delivery passage;
    a cylindrical fuel complete conversion chamber disposed concentrically about the fuel partial conversion chamber and the gaseous nitrogen output chamber;
    a cylindrical first oxygen separation membrane disposed concentrically about the fuel complete conversion chamber;
    a cylindrical second air delivery passage disposed about the first oxygen separation membrane;
    a cylindrical second oxygen separation membrane disposed concentrically about the second air delivery passage;
    a synthetic gas combustion chamber disposed concentrically about the second oxygen separation membrane;
    a cylindrical third oxygen separation membrane disposed concentrically about the synthetic gas combustion chamber;
    a first turbine exhaust collection and synthetic gas production chamber disposed concentrically about the third oxygen separation membrane; and
    a cylindrical second turbine exhaust collection chamber disposed concentrically about the first turbine exhaust collection chamber,
    wherein the power turbine system further comprises a fuel line passing through a condenser and connecting to a fuel injector disposed at an upstream end of the elongate fuel evaporation core, wherein the condenser is connected to the second turbine exhaust collection chamber such that an exhaust mixture passes from the second turbine exhaust collection chamber through the condenser in a countercurrent direction to a fuel flow in the fuel line and the exhaust mixture is cooled by the fuel line in the condenser to condense water.

2. The power turbine system according to claim 1, wherein the ion transport membranes are disposed in a mutually concentric cylindrical array.

3. The power turbine system according to claim 1, further comprising:
    a heavy liquid fuel heater disposed within the reactor, the reactor combusting a heavy liquid fuel therein to produce at least exhaust product, a portion of the at least one exhaust product comprising carbon dioxide; and
    a water and carbon dioxide condenser and collector disposed externally to the reactor, the condenser and collector communicating with the reactor, the condenser and collector recycling a first portion of collected carbon dioxide back to the reactor and further delivering a second portion of collected carbon dioxide for sequestration.

4. The power turbine system according to claim 1, wherein the first turbine exhaust collection and synthetic gas production chamber communicates with the first turbine and the second turbine exhaust collection chamber communicates with the second turbine.

5. The power turbine system according to claim 1, wherein the first oxygen separation membrane, the second oxygen separation membrane, and the third oxygen separation membrane include ion transport membranes.

6. The power turbine system according to claim 1, wherein:
    the fuel partial conversion chamber is adapted for partial combustion of fuel therein; and
    the fuel complete conversion chamber communicates with the fuel partial conversion chamber, the fuel complete conversion chamber being adapted for complete combustion of fuel therein.

7. A method for liquid fuel combustion using the multi-stage ion transport membrane reactor according to claim 1, comprising the steps of:
introducing liquid fuel into the elongate fuel evaporation core;
introducing compressed atmospheric air into the first air delivery passage;
separating oxygen from the compressed atmospheric air through the button cell ion transport membrane;
introducing the oxygen into the fuel partial conversion chamber through the button cell ion transport membrane;
partially converting fuel flowing m the partial conversion chamber using the oxygen flowing from the button cell ion transport membrane to provide partially converted fuel;
flowing the partially converted fuel into the fuel complete conversion chamber;
introducing compressed atmospheric air into the second air delivery passage;
passing oxygen from the atmospheric air in the second air delivery passage through the first oxygen separation membrane into the fuel complete conversion chamber for complete combustion of fuel flowing therein to provide a first exhaust product comprising carbon dioxide ($CO_2$) and water ($H_2O$);
powering the first turbine with the first exhaust product;
flowing the first exhaust product from the first turbine through the first turbine exhaust collection and synthetic gas production chamber to the synthetic gas combustion chamber;
receiving oxygen in the synthetic gas combustion chamber through the second and third oxygen separation membranes to completely combust the first exhaust product in the synthetic gas combustion chamber and produce a second exhaust product; and
driving the second power turbine with the second exhaust product.

\* \* \* \* \*